Sept. 30, 1969 B. E. PECK ET AL 3,469,310

METHODS FOR MAKING MAGNETIC CORE MEMORY STRUCTURES

Original Filed Sept. 17, 1959

2 Sheets-Sheet 1

INVENTORS
BRUCE E. PECK
CALVIN FUJIMOTO

BY Louis A Kline
John J. Maclago
Richard J. Kempel
THEIR ATTORNEYS

Sept. 30, 1969 B. E. PECK ET AL 3,469,310
METHODS FOR MAKING MAGNETIC CORE MEMORY STRUCTURES
Original Filed Sept. 17, 1959 2 Sheets-Sheet 2
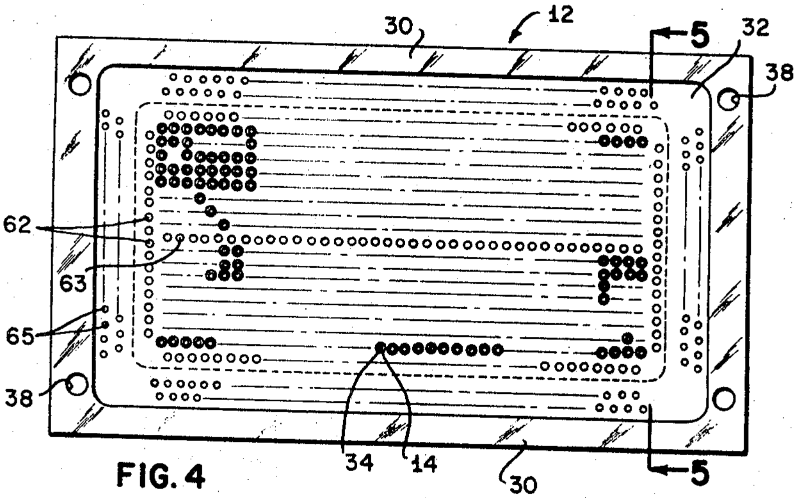
FIG. 4
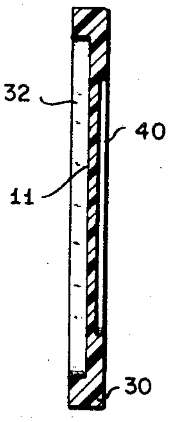
FIG. 5
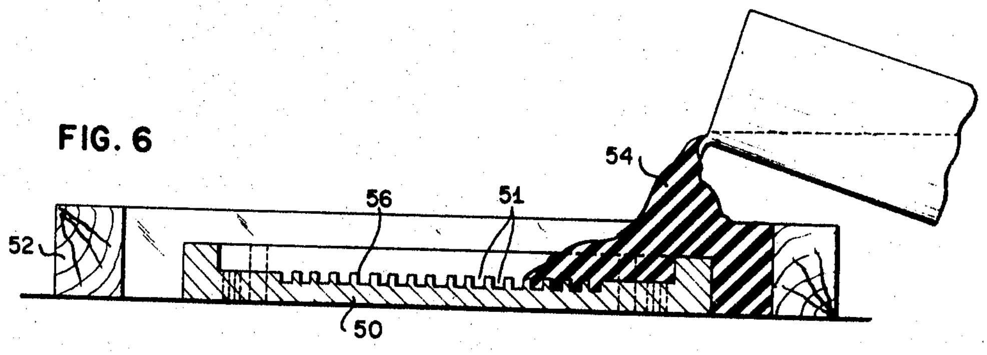
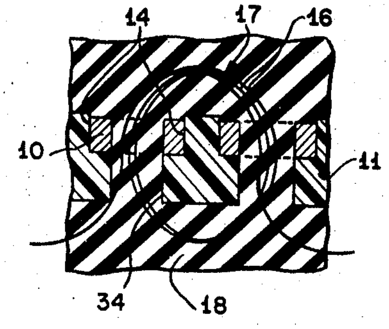
FIG. 7
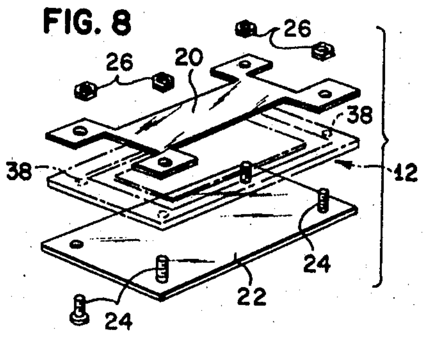
INVENTORS
BRUCE E. PECK
CALVIN FUJIMOTO
BY Louis A. Kline
John J. Matlago
Richard D. Seguie
THEIR ATTORNEYS United States Patent Office 3,469,310
Patented Sept. 30, 1969

3,469,310
METHODS FOR MAKING MAGNETIC CORE MEMORY STRUCTURES

Bruce E. Peck, Natick, Mass., and Calvin Fujimoto, Compton, Calif., assignors to The National Cash Register Company, Dayton, Ohio, a corporation of Maryland Original application Sept. 17, 1959, Ser. No. 840,629, now Patent No. 3,181,128, dated Apr. 27, 1965. Divided and this application Mar. 8, 1965, Ser. No. 437,683
Int. Cl. H01f 7/06
U.S. Cl. 29—604 10 Claims

ABSTRACT OF THE DISCLOSURE

A method of forming a core plane for magnetic storage and retrieval of binary data which comprises the steps of placing magnetic cores in an array in seats provided therefor in a rigid carrier plate; passing individual conductors through the apertures of the cores and opposing openings in the carrier which are aligned with the core apertures to provide read, write and sense windings for the storage and retrieval of data, and connecting the conductors to terminals about the periphery of the carrier; forming a matrix for protecting the cores from vibration and shock by surrounding the cores and windings with uncured elastomeric material to form a continuous mass of said elastomeric material in which the cores and windings therefor are completely embedded in the continuous mass of elastomeric material; curing the elastomeric material to its elastomeric state to provide an elastomeric suspension medium in which the continuous mass thereof isolates the cores from vibration and shock; and increasing the stiffness of this assembly to reduce the effects of resonance by securing a metal cover plate to the assembly.

This is a division of application Ser. No. 840,629, filed Sept. 17, 1959 and now Patent No. 3,181,128.

The present invention is directed to methods for making magnetic core memory structures, and more particularly to rugged magnetic core memory structures which are capable of enduring severe environmental conditions and simple and inexpensive procedures for making such structures.

In many instances, magnetic core memories have been found superior to other memories for use in computers, data storage systems and other apparatus having a need for the storage of information and easy access thereto. The magnetic core memory assemblies are made up of a plurality of magnetic storage elements arranged in a geometrical array, and electrical windings which are coupled to the elements in a predetermined manner. Since the magnetic properties of ferrite material are ideal for memory circuits, i.e., the hysteresis characteristic is approximately rectangular, the more common magnetic cores found in magnetic core memory assemblies are made from ferrite material.

A typical magnetic core has a ring-like configuration and is extremely small in size, often having an outside diameter of less than 1/10 of an inch. In many instances, the cores are produced in mass production, employing powdered metallurgy techniques to reduce the cost of individual cores. The mass produced cores are annular or toroidal in shape having sharp annular edges. The ferrite cores take the form of a ceramic material which is extremely hard and brittle and will chip or crack if subjected to stress. The sharp edges and fragile nature of the cores are distinct disadvantages which have limited the effective usefulness of memories employing a magnetic core array. Previously, these limitations and disadvantages of magnetic cores have restricted the use of magnetic core memories to conventional environments in which vibration, shock, heat and humidity are not severe.

Often, the failure of typical magnetic core memories in which the cores are suspended from the winding conductors or wires has been caused by sharp edges of the cores abrading the insulated conductors, in response to vibration of the memory assemblies, producing short circuits. In other instances, severe vibration or acceleration has caused failure of the memory due to chipping or breaking of the cores changing the characteristics of the core or breaking the wires. In order to prevent abrasion of the wires and chipping or cracking of the cores, it is sometimes the practice to clamp the cores by mechanical means or by embedding the cores and windings in a potting compound. The compound hardens to a relatively inelastic and rigid mass which is dimensionally unstable to the extent that it creates pressure on the cores producing a magnetostrictive effect which alters the hysteresis characteristic of the individual cores. A mechanical force produced by either the hardened potting compound or by mechanical clamping means can produce a magnetostrictive effect which alters the hysteresis characteristic producing unreliable signal outputs from the individual cores. Further, the mechanical force may be so great as to cause breaking or chipping of the cores which permanently alters the magnetic characteristics of the cores and their signal outputs, resulting in complete and permanent breakdown of the memory.

Whatever the exact reason is for failure of the magnetic core memories, it is apparent that prior to the present invention, an extremely valuable memory had not been utilized in an important and broad field of mobile applications because of the fragile and sensitive nature of the magnetic cores. In order to overcome the foregoing disadvantages of magnetic cores and provide a magnetic core memory usable in equipment subjected to unfavorable environmental conditions including environments causing severe vibration and acceleration of the memory assemblies, the magnetic core memory structure of the present invention has been developed.

In the preferred arrangement of the present invention, a magnetic core memory has been provided wherein a plurality of spaced annular magnetic cores are disposed in a geometrical array. The memory includes a carrier plate for supporting the cores in spaced relationship in approximately the same plane. When the cores are seated in the carrier, the core apertures provide for a maximum opening in the direction of approach of winding conductors to facilitate threading individual cores of the array in any of a plurality of predetermined orderly patterns with multiple turn windings individual to a core. The cores and windings are embedded in a matrix of cured, soft elastic material surrounding the carrier and dampening the response of the magnetic memory elements to vibration and shock to which the memory may be subjected. Furthermore, the matrix isolates the cores and windings from heat and humidity. In addition, the stiffness as well as the resonant frequency of the memory structure is increased by cover plates provided on the carrier.

An advantage of the present invention is low cost of fabrication since the arrangement of supporting the cores in the assembly permits multiple turn windings to be made easily. Further, the multiple turn windings provide for further system economies by reducing the current requirement of the cores in circuit operation.

It is an object of the present invention therefore, to provide a method for making a magnetic core memory having the foregoing features and advantages.

Another object of the inventon is to provide a new and useful method of making a magnetic core memory structure.

Still another object is the provision of methods for making a magnetic core memory unit capable of safely enduring environmental conditions including heat, humidity and severe vibration and acceleration of the memory structure.

A further object of the present invention is to provide a method for making a magnetic core memory in which the annular magnetic cores are disposed for facilitating threading of individual cores.

An additional object of the present invention is to provide a method for making a core memory in which annular magnetic cores are supported in a core plane to withstand severe vibration and acceleration.

Still another object of the invention is to provide methods for isolating cores and windings of a magnetic core memory from vibration and shock.

Further objects and features of the invention will be readily apparent to those skilled in the art from the specification and appended drawing illustrating certain preferred embodiments in which:

FIG. 1 is a perspective external view of a preferred embodiment of the invention;

FIG. 1*a* is a detail view of a portion of the structure shown in FIG. 1 from the under surface thereof wherein certain underside portions are broken away to expose the interior thereof;

FIG. 4 is a top plan view of a carrier utilized in the structure for supporting the cores of the array;

FIG. 5 is a vertical section of the carrier shown in FIG. 4 and taken on the line 5—5;

FIG. 6 is a diagrammatic view, partly in vertical section, of apparatus utilized in the preferred method of forming the mold shown in FIG. 3;

FIG. 7 is a detail view of the structure shown in FIG. 1 showing typical toroidal magnetic cores and a typical winding having a plurality of turns threaded through the apertures of the cores; and FIG. 8 is an exploded view of the structure of the preferred embodiment shown in FIG. 1.

Figures 1, 1A, 2:
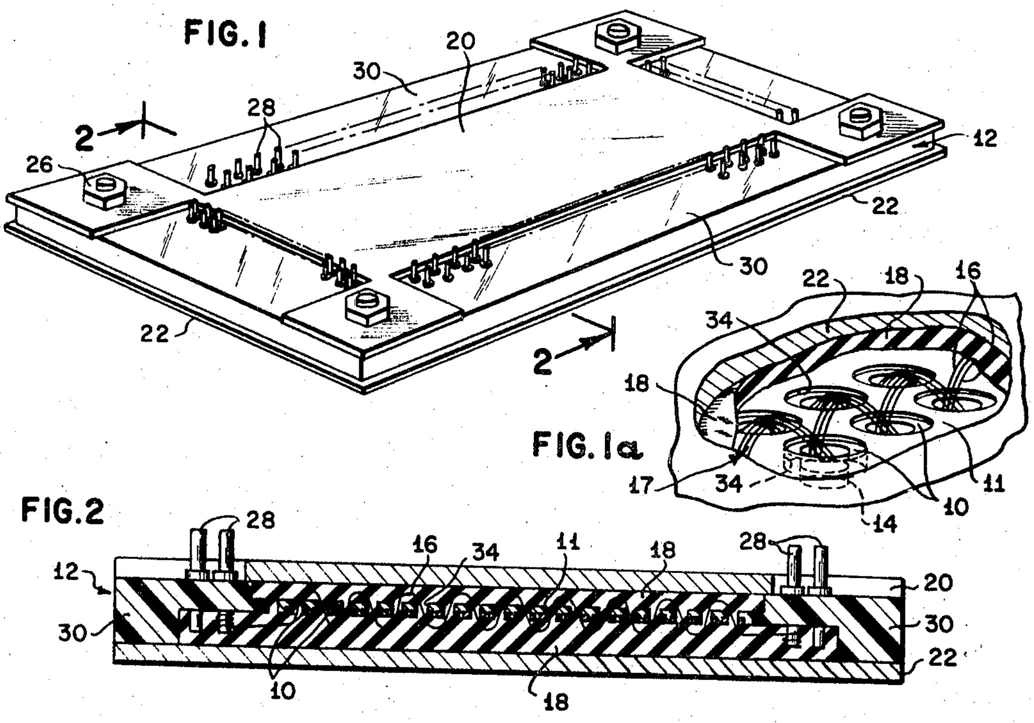
FIG. 2 is a cross sectional view of the structure shown in FIG. 1 taken along the line 2—2 and looking in the direction of the arrows.

Referring now to the drawings wherein like reference characters designate like or corresponding parts throughout the several views, there is shown in FIGS. 1 and 1*a* which illustrate a preferred embodiment, a rectangular magnetic core member structure comprising an array of annular or toroidal magnetic cores 10 supported in spaced relationship in a core plane by a core carrier plate 12 comprising a central plate portion 11 having a plurality of spaced annular openings 14 to provide close fitting seats for the cores, and a peripheral flange 30 surrounding the plate portion 11. As illustrated in FIGS. 1*a* and 7, the annular magnetic cores, when seated in the openings 14, are positioned for maximum access to the core aperture for the passage of winding conductors 16 which approach from a direction which is normal to the core plane and the plane of the carrier plate. The winding conductors 16 are readily passed through the same core aperture a plurality of times, by also passing the conductor through an adjacent core or an adjacent opening 14 in the carrier plate 12, to thereby provide core windings 17 having a plurality of turns or multiple turns. The windings illustrated in FIGS. 1*a* and 7 for example, are shown having three turns in each winding.

The array of cores 10 and the winding conductors 16 are resiliently secured in a matrix 8 formed of cured soft elestic material, e.g., silicone materials including silicone rubber or polysiloxane or other elastomeric materials.

Referring now to FIG. 8, cover plates 20 and 22 are shown in alignment prior to being secured to respective sides of the core carrier plate 12 by suitable means; e.g., bonding the opposing surfaces by an adhesive applied to the opposing surfaces of the cover plates. Bolts 24 passing through conjugate holes in the respective corners of the carrier plate and covers, are retained in position by respective nuts 26. A series of memory structures can be disposed in opposing relationship or the structure can be mounted in position by passing elongated supporting members through the corner holes in a manner similar to bolts 24.

In FIGS. 1 and 2, terminals 28 are shown disposed in the peripheral flange 30 of the core carrier plate 12 and about the core array to facilitate connection of the core windings 17 to external apparatus. The terminals 28 are shown as electrically conductive metal dowels having an intermediate shoulder which seats against the upper surface of the peripheral flange. As shown in FIG. 2, the lower portions of the terminals are passed through the flange 30 to provide for internal connections to the winding conductors 16. The lower portions of the terminals are embedded in the elastomeric material of the matrix 18 along with the cores 10 and the winding conductors 18.

In the preferred arrangement, the core carrier plate 12, as shown in FIGS. 4 and 5, comprises a rectangular plate formed from rigid, and preferably, insulating material which can be cast or otherwise readily formed, e.g., organic materials; however, the plate could be formed of electrically conductive material which has been coated by an insulator, e.g., aluminum plate which has been hard-anodized. The upper and lower surfaces of the carrier plate 12 with peripheral flange 30 provides recesses to receive the matrix material 18. Larger upper recess 32 extends above the ends of terminals 28. Thus, as shown in FIG. 2, the ends of the terminals are located within the recess whereby the terminal connections are embedded in the elastomeric material forming the matrix 18. The annular openings 14, providing the close fitting seat for the magnetic cores, open into the upper recess 32 whereby the cores may be placed into the openings 14 from the upper side of the plate. A hole 34 is provided at the bottom wall of each opening for the passage of the winding conductors passing through the core apertures and through the plate.

The peripheral area adjacent the core array is perforated to accommodate the shanks of the terminals 28, the lower portions of which pass through the carrier plate 12. The outer periphery of the flange 30 is provided with holes 38 for the passage of the bolts 24 or other means as stated supra. As shown in FIGS. 4 and 5, lower recess 40, formed by peripheral flange 30, accommodates the winding conductors within the core plate whereby the matrix 18 filling the recess will embed the conductors in the soft elastic material to resiliently secure them from relative movement due to vibration, shock or the like.

The carrier plate 12, which is provided for supporting the magnetic memory core in the core structure, is produced by first forming a master carrier plate 50, shown in FIG. 6. The master carrier plate is similar in shape to the cast carrier plate shown in FIGS. 4 and 5. Preferably, the master carrier plate is formed from a rigid material, such as an easily machined metal, and includes an array of counterbores which are disposed in a pattern arrangement identical to the annular openings 14, and other openings in the carrier plate 12.

Figure 3:
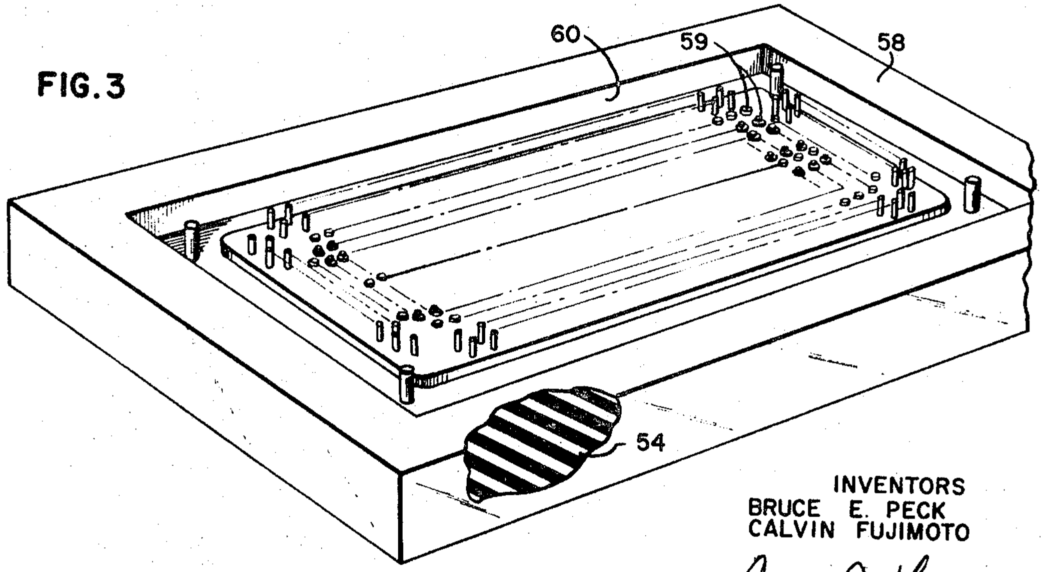
FIG. 3 is a perspective view of a mold including a negative replica of a carrier for supporting magnetic cores in the structure shown in FIG. 1.

The process for producing carrier plate 12 from the master carrier plate 50, is illustrated in FIG. 6, which shows a cross section of the master plate 50, which, with the exception of recess 40, has the identical shape as the cross section of the carrier plate 12, shown in FIG. 4. Openings 51, for example, in master plate 50 correspond to holes 62 in the plate 12. This process includes the steps of placing the master, facing upwardly, in an open receptacle or box form 52 and applying or pouring an uncured elastic material 54, such as silicone material, over the exposed surfaces 56. After the elastic material 54 envelopes or covers the entire upper surfaces of the master carrier plate 50, the material is allowed to cure or set. Once the material has set, a cured mold such as the mold 58, shown in FIG. 3, is separated from the master carrier plate. This mold 58 has a negative replica of the master carrier formed in its cavity 60. The next step in making the carrier plate 12 is to apply a material such as polymerized acrylic resin, into cavity 60 over the exposed surfaces 59. After this resin material envelopes or covers the entire surfaces of the mold 58, the material is allowed to cure or set, after which this completed carrier plate 12 is removed. This mold 58 can be used to form many carrier plates 12 by filling the cavity 60 with uncured material and, after curing, removing the rigid casting so formed from the cavity 60. After removal, lower recess 40 is then machined on the cast carrier plate.

Referring to FIGS. 4 and 5 once more, holes 62 are shown to have been formed in the cast carrier plate 12 to connect the upper and lower recesses 32 and 40. Peripheral openings 62 and intermediate openings 63 provide convenient access for the winding conductors 16 to either side of the carrier plate whereby the cores can be wound in the proper direction to provide a desired polarity of the winding on the individual cores.

The magnetic memory core assembly is constructed to provide maximum access to the core apertures during winding of the cores 10 which are positioned in the openings 14 in the carrier plate 12. To this end, the cores, as shown in FIG. 1*a*, are positioned with the apertures in the plane of the carrier plate 12. In the preferred arrangement, blocking of the core apertures by the winding conductors 16, which would normally lie diagonally in the core aperture, is minimized by returning the conductors laterally in the same general direction, if necessary, after passage through a core aperture by passing the conductor through a hole 62 located in the return direction. Thus, the conductors will lie flat against the inner periphery of the core. As stated supra, the holes 62, shown in FIG. 4, also provide for passing the conductors to the side of the plate 12 for winding the cores in the proper direction to provide the desired polarity of the core windings on the individual cores.

In the assembly of the magnetic memory core structure, the annular magnetic cores 10, shown in FIG. 1*a*, are seated in the openings 14 and the conductors 16 are threaded through the core apertures and holes in the carrier plate in a predetermined sequence to provide core windings which are interconnected in a desired manner for the magnetic core array. The ends of the conductors are connected to the terminals 28 which extend through the core plate 12 to provide external input and output connections. The matrix 18 is formed subsequently by embedding the cores and windings in a soft elastic material and closing off the upper and lower recesses 32 and 40, e.g., by the cover plates 20 and 22, as shown in FIG. 2. In the preferred process, special plates are used to close off the recesses 32 and 40 during the forming of the matrix which is accomplished by forcing an uncured soft elastic material into the recess 32 through an aperture in the special cover plate similar to plate 22. If the uncured matrix material is injected iwth adequate pressure, it will surround the cores and windings and pass through the core aperture and holes in the carrier plate 12 and also fill the recess 40. Upon the curing of this material, a soft elastic matrix is formed for resiliently supporting the cores and coil winding conductors. The special plates used to close off the recesses 32 and 40 during the forming of the matrix are removed after the material sets. Subsequently, cover plates 20 and 22 are bonded to the opposing portions of the carrier plate and matrix by a suitable adhesive. The bolts 24, which are shown passing through the corresponding holes in the cover plates and carrier plate, could be used as permanent retaining means if rods or other elongated support means are not utilized to mount the memory structure along with other memory structure in a suitable enclosure.

In the preferred arrangement of the memory structure, as illustrated in FIGS. 1*a*, 2 and 7, the material forming the matrix 18 fills all the recesses or cavities between the cover plates 20 and 22 in addition to merely surrounding the cores 10 and conductors 16. In an alternate arrangement, the matrix is formed from two or more materials. The soft elastic material is applied to the carrier cores and wires and surrounds substantially only the cores and wires and an organic foam is applied over the cured soft elastic material, filling the recesses 32 and 40 in the carrier. After the organic form, e.g., polyurethane, has hardened, it acts to inhibit relative movement of the cores and wires and central area of the carrier plate relative to the peripheral flange in response to vibration and shock. For the more severe environmental conditions, the construction found in the alternate arrangement provides additional protection to the memory elements and windings, although the preferred and more economical construction of the preferred arrangement has been found satisfactory.

In the light of the above teachings, various modification and variations of the present invention are contemplated and are apparent to those skilled in the art without departing from the spirit and scope of the invention.

What is claimed is:

1. The method of producing a magnetic core assembly which method comprises: placing magnetic cores in a recessed plastic carrier plate having terminals and having spaced openings for receiving and seating the cores whereby the apertures in the cores are disposed opposite holes in the carrier plate located in the end walls of the openings; passing individual conductors through apertures in the cores and respective opposing holes and winding the conductor around a portion of the respective cores and sections of the carrier plate to provide windings for the cores and securing the individual cores to the carrier plate; connecting said conductors to said terminals located about said carrier plate; embedding the array of cores and windings in a matrix to resiliently support the cores and windings in their respective positions by surrounding the cores and windings with an uncured elastic material placed in recesses on each side of the carrier plate; curing the material to provide elastomeric suspension medium for shock mounting of the cores and winding conductors in the array; and increasing the stiffness and resonant frequency of the resulting assembly by securing a metal cover plate over at least one side of the matrix and carrier plate.

2. The method of making a magnetic core array which method comprises: forming a master carrier from rigid material having multiple openings for receiving and seating magnetic cores and a hole in the bottom wall of each opening providing for the passage of conductors through the carrier and apertures in the respective cores; making a soft elastic mold including a negative replica of the master carrier by placing the master carrier in a receptacle and applying uncured elastic material over the exposed surfaces of the master carrier and curing said material; removing the cured mold from the master carrier; covering the negative replica in the cavity of the mold with uncured second material and curing the second material to form a rigid cast carrier which is a duplicate of the master carrier; removing the cast carrier from the master carrier; placing magnetic cores in the cast carrier and seating the cores to dispose the apertures in the cores in conjugate relationship with said holes; passing individual conductors through apertures in the cores and respective conjugate holes to provide windings for the cores; and embedding the cores and windings in a matrix to resiliently support the cores and windings in their respective positions by surrounding the cores and windings with an uncured elastomeric material and curing the elastomeric material, to thereby provide an elastomeric suspension medium for the array.

3. The method of making a magnetic core array which method comprises: forming a master carrier from rigid material having multiple openings which are approximately cylindrical for receiving and seating magnetic cores and a hole in the bottom wall of each opening providing for the passage of conductors through the carrier and apertures in the respective cores; making a soft elastic mold including a negative replica of the master carrier by placing the master carrier facing upwardly in an open receptacle and applying uncured elastic material over the exposed surfaces of the master carrier and curing said material; removing the cured mold from the master carrier; covering the negative replica in the cavity of the mold with uncured second material; curing the second material to form rigid cast carriers which are duplicates of the master carrier; removing the cast carrier from the master carrier; placing magnetic cores in the cast carriers and seating the cores to dispose the apertures in the cores in conjugate relationship with said holes; passing individual conductors through each aperture in the cores and respective conjugate holes a plurality of times to provide windings for the cores having a plurality of turns; and embedding the cores and windings in a matrix to resiliently support the cores and windings in their respective positions by surrounding the cores and windings with an uncured elastomeric material and curing the elastomeric material to thereby provide an elastomeric suspension medium for the array.

4. The method of resiliently securing magnetic core members in a memory structure comprising the following steps: assembling a memory array including magnetic core members and groups of series connected windings therefor in a structural arrangement including a carrier having a peripheral flange defining opposed recessed areas in said carrier and having an array of openings in said carrier adjacent said opposed recessed areas for receiving said core members and for supporting said core members and windings therefor in predetermined relationship, positioning said core members in said openings to form said memory array for providing magnetic coupling between the core members and respective windings therefor in a predetermined manner for storing and retrieving binary digits in groups in accordance with said group connections of the windings; embedding at least a portion of said magnetic core members of the memory array in a matrix disposing at least a portion of each of the magnetic core members in a continuous mass of uncured elastomeric material extending into said recessed areas in said carrier; and curing said elastomeric material to form a soft, elastic matrix to resiliently secure said magnetic core members in their respective positions in said array to prevent relative movement of the core members and their respective windings therefor when subjected to vibration or other environmental conditions tending to cause relative movement of the core members and their respective windings.

5. The method of resiliently securing magnetic core members in a memory structure comprising the following steps: assembling a memory array including magnetic core members and groups of series connected windings therefor in a structural arrangement including a carrier having opposing recesses defining a central area for said core members and windings, said recessed central area of the carrier having an array of openings for receiving said core members and for supporting said core members and windings therefor in predetermined relationship, positioning said core members in said openings to form said memory array providing magnetic coupling between the core members and windings in a predetermined manner for storing and retrieving binary digits; embedding said core members of the memory array in a matrix of elastomeric material to thereby resiliently maintain each of the magnetic core members in their respective positions in said openings and windings by forming enclosed areas including said opposing recesses between the positioned core members in said carrier and cover plates in which the enclosed areas include uncured elastomeric material in a liquid state which at least partially fills the enclosed areas including said opposing recesses to envelop at least a portion of each of the core members; and curing said elastomeric material to form said matrix while at least a portion of each of said core members is enveloped thereby to embed said core members in the elastomeric material of said matrix to prevent relative movement of the core members and windings therefor when subjected to vibration and other environmental conditions which in the absence of said matrix would cause displacement of said core members relative to said windings.

6. The method of resiliently securing strain-sensitive magnetic storage elements in a memory array including embedding at least a portion of each of the magnetic storage elements, windings and interconnections therefor to form said memory array in an uncured elastomeric material and curing said elastomeric material comprising: mounting the magnetic storage elements, windings and interconnections for said windings forming said memory array in a carrier of self-supporting material to provide magnetic coupling between the storage elements and their respective windings in the memory array, said carrier having a peripheral flange providing opposing central recessed areas and having apertures extending through said carrier between said recessed areas for seating said elements and passing said windings wherein at least a portion of said interconnections for the windings in the memory array are disposed in said recessed areas and outside of said apertures; providing a cover plate and positioning said carrier and cover plate together on said peripheral flange to provide an enclosure for at least one of said recessed areas for the magnetic storage elements mounted in said carrier, and at least partially filling said enclosure with a continuous mass of uncured elastomeric material so as to envelop at least a portion of each of the magnetic storage elements, windings and interconnections in said enclosure in said elastomeric material; and curing said elastomeric material to provide a matrix of cured elastomeric material in which each of the storage elements is resiliently secured to prevent relative movement of magnetic storage elements, their respective windings and interconnections for the windings in said enclosure in the memory array.

7. The method of resiliently securing strain-sensitive magnetic storage elements in a memory array including enveloping at least a portion of each of the magnetic storage elements within a continuous mass of uncured, soft-resilient material and curing the soft-resilient material comprising: mounting the magnetic storage elements and windings therefor in a carrier of self-supporting material having a peripheral flange defining opposing recesses interconnected by apertures for said storage elements and windings; providing cover plates over said recesses and positioning said carrier and cover plates together to provide an enclosure for encasing the magnetic storage elements and windings mounted in said carrier, and at least partially filling said enclosure with said continuous mass of uncured soft-resilient material so as to envelop at least a portion of each of the magnetic storage elements therein; and curing said soft-resilient material to provide a matrix which secures each of the magnetic storage elements in their respective positions in the memory array to maintain the magnetic coupling of said magnetic storage elements and their respective windings without producing strains on said magnetic storage elements.

8. The method of embedding strain-sensitive magnetic storage elements of a memory structure in order to prevent displacement of said elements in the assembled memory structure without producing strains on said elements which method comprises: assembling a memory array including magnetic storage elements and windings therefor including the steps of providing carriers for supporting said storage elements and windings and conductors intercoupling said storage elements to form said memory array wherein each of said carriers has an array of apertures for receiving said storage elements, positioning the magnetic storage elements in said apertures whereby magnetic fields produced by said windings for reading and writing binary digits controls the state of magnetization of said storage elements; said assembled memory structure including opposing recesses on each side thereof for housing said conductors intercoupling said storage elements; enveloping at least a portion of each of the storage elements in a continuous mass of uncured elastomeric material, said continuous mass of elastomeric material extending into at least a portion of each of said recessed areas adjacent said storage elements; and curing said elastomeric material while said portions of said storage elements are enveloped therein to embed the portions of said storage elements in a continuous mass of cured elastomeric material to resiliently retain said portions of said core members in their respective positions.

9. A method of sealing and protecting strain-sensitive magnetic storage elements in a memory array including windings magnetically coupled to said magnetic storage elements, consisting of providing a pre-formed molded encasing member of a hard, self-supporting material having a support member within said encasing member for supporting the windings and magnetic storage elements, said support member having an array of openings formed therein for receiving said magnetic storage elements; positioning the strain-sensitive magnetic storage elements in said array of openings to locate the individual storage elements and respective windings therefor in cooperative relationship for magnetically coupling the individual magnetic storage elements and their respective windings for storing and retrieving binary data in the memory array; placing a cover over said magnetic storage elements and enveloping at least a portion of each of said elements in a continuous mass of uncured elastomeric material; and curing the elastomeric material to resiliently secure the strain-sensitive magnetic storage elements in position in the openings in said support member and in said cooperative relationship with their respective windings by the continuous mass of cured elastomeric material.

10. A method of making a magnetic core memory array consisting of providing a pre-formed molded encasing member of a hard, self-supporting material having a support member within said encasing member, said support member having openings formed therein to connect upper and lower cavities formed by the support member in the encasing member, positioning toroidal magnetic cores within the openings; and passing electrical conductors through the apertures in the magnetic cores and the openings in the support member in a predetermined manner to form windings of a memory array for storing and retrieving binary data; at least partially filling the cavities with an elastomeric material to entirely envelop and cover the magnetic cores and windings, and curing the elastomeric material to form a matrix for resiliently suspending the magnetic cores and windings of said memory array.

References Cited

UNITED STATES PATENTS

| | | | |
|---|---|---|---|
| 2,874,313 | 2/1959 | Githens -------------- | 339—18 |
| 3,106,769 | 10/1963 | Goethe et el. ------ | 336—96 X |

JOHN F. CAMPBELL, Primary Examiner

ROBERT W. CHURCH, Assistant Examiner

U.S. Cl. X.R.

264—272; 336—96